3,055,747
DIMETHYL-(MONOCHLOROTOLYL)-PHOSPHATE AS A GASOLINE ADDITIVE
Harold D. Orloff, Oak Park, Mich., and Francis X. Markley, Bound Brook, N.J., assignors to Ethyl Corporation, New York, N.Y., a corporation of Delaware
No Drawing. Original application Dec. 22, 1954, Ser. No. 477,139, now Patent No. 2,870,186, dated Jan. 20, 1959. Divided and this application Apr. 14, 1958, Ser. No. 728,039
2 Claims. (Cl. 44—69)

This invention relates to dimethyl-(monochlorotolyl)-phosphate.

Organic compounds of phosphorus have been suggested as gasoline additives to reduce surface ignition, spark plug fouling, and associated problems. However, for one or more reasons phosphorus compounds known and so used heretofore have not been entirely satisfactory. Typical limitations hindering otherwise acceptable additives included instability, low hydrocarbon solubility, high water solubility, corrosiveness, insufficient engine inductibility, and characteristics promoting reduction in antiknock effectiveness and loss in exhaust valve life.

We have discovered an ester of phosphoric acid which not only is devoid of the above limitations, but is capable of reducing deposit-induced engine problems, such as surface ignition and spark plug fouling, to the point of virtual elimination.

An object of this invention is to provide new and useful phosphates. Another object is to provide compounds which are admirably suited for use as addition agents for hydrocarbons of the gasoline boiling range and for other purposes. A further object is to provide both improved fuels for spark ignition internal combustion engines and composite additives for gasoline.

The above and other objects are accomplished by providing dimethyl-(monochlorotolyl)-phosphate having the formula

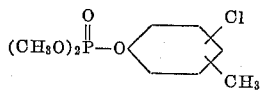

The properties of our novel phosphate makes it particularly useful as a gasoline additive. Thus, we provide improved hydrocarbon fuels of the gasoline boiling range useful for spark ignition engines containing a dimethyl-(monochlorotolyl)-phosphate. Such fuels preferably contain an organolead antiknock agent. Also provided by the characteristics of our compounds are improved composite additives for fuel for spark ignition engines comprising an organolead antiknock agent and our novel phosphate.

The ester of this invention can be prepared by reacting dimethyl phosphoryl chloride with the sodium salt of monochloro cresol. The reaction is carried out by contacting approximately equimolar proportions of these reagents while maintaining the temperature at about 25° C. Good results are also obtained when employing a slight excess of the above sodium salt—about 0.2 of a mole over theoretical.

The above process is carried out with agitation. Since the reaction is somewhat exothermic, temperature control is maintained by regulation of the rate of addition of the reactants as well as by conducting the reaction in such a manner that heat can be removed from the reaction zone.

Upon completion of the reaction, the crude product is washed with an alkaline substance, such as a 10 percent aqueous sodium hydroxide solution, followed by water washing. The product is then dried and distilled at reduced pressure.

Dimethyl phosphoryl chloride used as a starting material is conveniently prepared by reacting dimethyl hydrogen phosphite with chlorine gas, the reactants being in approximately equimolar proportions. The temperature of this reaction is kept below about 20° C. by controlling the rate of addition of the chlorine gas. Hydrogen chloride gas liberated in this reaction is removed by a convenient means, such as aspiration or air blowing.

To prepare the monochlorinated cresol, the sodium salt of which is the other starting material in the above preparation, o-, m-, or p-cresol (or mixtures thereof) is chlorinated in the absence of light. The temperature of the chlorination reaction is in the order of about 40 to about 70° C. If desired, a Lewis acid catalyst may be used. On completion of the reaction, which involves molar equivalents of the reactants, residual hydrogen chloride is removed by aspiration or the like.

The following examples wherein all parts and percentages are by weight illustrate the preparation of the novel ester of this invention.

EXAMPLE I 70 parts of chlorine gas is added portionwise to 110 parts of dimethyl hydrogen phosphite over a period of two hours while the reaction temperature is kept below 20° C. Hydrogen chloride gas is removed by aspirator suction. Then 180 parts of the sodium salt of monochlorocresol (mixed isomers) dissolved in 240 parts of water is incrementally added to the reaction vessel while holding the temperature at 25° C. The product of reaction is washed twice with 10 percent sodium hydroxide aqueous solution followed by two washings with water. The crude dimethyl-(monochlorotolyl)-phosphate is then dried and distilled at a pressure of 1.0 millimeter of mercury. It has a boiling point of 131° C. at 0.75 millimeter of mercury pressure. Chemical analysis corresponds to the empirical formula $C_9H_{12}O_4ClP$.

EXAMPLE II

The procdure of Example I is repeated with the exception that the sodium salt of p-chloro-m-cresol is used as a reagent instead of the sodium salt of the mixed isomers. Dimethyl-(4-chloro-3-methylphenyl)-phosphate is formed. It boils at 131° C. at 0.75 millimeter of mercury pressure.

By suitable choice of starting materials, the following isomers can be obtained:

Dimethyl-(3-chloro-2-methylphenyl)-phosphate;
dimethyl-(4-chloro-2-methylphenyl)-phosphate;
dimethyl-(5-chloro-2-methylphenyl)-phosphate;
dimethyl-(6-chloro-2-methylphenyl)-phosphate;
dimethyl-(2-chloro-3-methylphenyl)-phosphate;
dimethyl-(4-chloro-3-methylphenyl)-phosphate;
dimethyl-(5-chloro-3-methylphenyl)-phosphate;
dimethyl-(6-chloro-3-methylphenyl)-phosphate;
dimethyl-(2-chloro-4-methylphenyl)-phosphate; and
dimethyl-(3-chloro-4-methylphenyl)-phosphate.

Mixtures of two or more of these isomers are formed by selecting an appropriate mixture of chlorocresols from which the sodium salts are prepared.

The novel ester of this invention is a colorless liquid which is highly soluble in most organic solvents. For example, it is soluble in all proportions at 25° C. in various gasoline stocks such as straight run fuels; cracked fuels, resulting from thermal and catalytic processes; and other fuel types such as those obtained by reforming, catalytic reforming or alkylation.

Dimethyl-(monochlorotolyl)-phosphate when present in leaded gasoline in which the lead content is from 0.5 to 6.5 grams per gallon reduces surface ignition, also known as wild ping. In this capacity, our ester acts as an ignition control compound by suppressing the erratic uncontrolled ignition occurring at a period in the combustion cycle different from that produced by the spark.

A striking property of the phosphate of this invention is the ability to combat spark plug fouling when gasolines containing the same are used to operate spark ignition engines. Thus, not only do the leaded gasolines of this invention exhibit greatly improved performance characteristics from the standpoint of surface ignition, but they suppress spark plug fouling to the point where it is virtually non-existent.

As an additive to leaded hydrocarbons of the gasoline boiling range, we employ our compound in amount such that the phosphorus-to-lead atom ratio is from about 0.1:3 to about 1:3 (i.e., about 0.05 to about 0.5 theory of phosphorus). This amount is sufficient to overcome deposit-induced autoignition and spark plug fouling.

The following examples wherein parts are by weight illustrate the manner in which improved fuel compositions of the present invention are prepared.

EXAMPLE III

To 2770 parts of a blend of straight run, catalytically cracked and polymer blending stocks containing 4.9 parts of tetraethyllead, 0.5 theory of bromine as ethylene dibromide, and 1.0 theory of chlorine as ethylene dichloride is added 0.5 part of dimethyl-(monochlorotolyl)-phosphate (mixed isomers). Upon mechanically agitating this mixture, a homogeneous improved fuel composition of this invention having a phosphorus-to-lead atom ratio of 0.4:3 is obtained.

EXAMPLE IV

To 3000 parts of a high octane quality aviation fuel base stock containing 7.6 parts of tetraethyllead as an antiknock fluid comprising tetraethyllead and 1.0 theory of bromine as ethylene dibromide is added 1.4 parts of dimethyl-(3-chloro-2-methylphenyl)-phosphate. Agitation of this mixture produces a homogeneous improved fuel composition of this invention having a phosphorus-to-lead atom ratio of 0.6:3.

Example III is illustrative of the manner in which a typical automotive fuel of this invention is compounded. The preparation of a typical aviation fuel of our invention is described in Example IV. Both of these fuels reduce wild ping rate by as much as 80 percent of that produced by the same fuels in the absence of our compound.

Fuels of this invention were subjected to a standard engine test method designed to demonstrate effect on spark plug fouling. The tests involved modern V-8 passenger car engines attached to dynamometers, the engines being operated on the following cyclic procedure:

(1) *180 seconds at 1500 r.p.m.—equivalent to about 40 m.p.h.*—Throughout this period, the throttle setting is varied in such a manner that conditions existing in a vehicle moving in traffic are closely approximated.

(2) *6 seconds of acceleration—attainment of 3100 r.p.m. at one-half throttle.*—The engine then decelerates at idle throttle setting and the cycle is repeated.

Using a commercial automotive gasoline base stock containing 3.0 milliliters of tetraethyllead per gallon, about 0.5 theory of bromine as ethylene dibromide, and about 1.0 theory of chlorine as ethylene dichloride, a base line value of average hours to 6 spark plug failures was obtained. Then the test was repeated using various phosphorus compounds as additives in the above-described leaded fuel. The amounts of such phosphorus compounds were adjusted such that in each case there was a phosphorus-to-lead atom ratio of 0.4:3. The results of these tests are shown in Table I in which the values shown are relative hours until six spark plug failures were detected, assigning a base line value (phosphorus-free fuel) of zero.

Table I

| Additive: | Relative spark plug performance |
|---|---|
| None (base line) | 0 |
| Tricresylphosphate | 127 |
| Dimethyl-(monochlorotolyl)-phosphate | 296 |

Inspection of these data shows that the improvement in spark plug performance brought about by our compound is unexpectedly great. In fact, our compound was over 233 percent more effective than tricresylphosphate, a commercially used phosphorus additive.

The novel ester of this invention has a number of characteristics further enhancing its utility as an additive for gasoline and antiknock fluids. It exhibits substantially no adverse effect on tetraethyllead antiknock effectiveness. It is readily blended with gasoline hydrocarbons, is compatible on storage in gasolines containing lead alkyl antiknock agents, and is highly inductible in multi-cylinder engines. Moreover, dimethyl-(monochlorotolyl)-phosphate is only sparingly soluble in water and resists hydrolysis.

Our ester exhibits practically no adverse effect on tetraethyllead antiknock effectiveness. This is illustrated by subjecting individual portions of gasoline containing a given concentration of tetraethyllead to the standard ASTM Research Method, Test Procedure D–908 (which can be found in the 1952 edition of "ASTM Manual of Engine Test Methods"). The same fuel is then treated with an appropriate concentration of our phosphate ester and the test is repeated. It is found that the antiknock effectiveness of the tetraethyllead present is virtually unchanged.

The phosphate of this invention being a hydrocarbon soluble liquid can be blended directly into the refinery stream by means of liquid proportioning pumps or the like, or gasoline concentrates such as 10 percent solutions can be readily prepared and similarly used.

When stored at a temperature of 110° F. for long periods of time, leaded gasoline containing 0.2 T of phosphorus as the phosphate of this invention shows no signs of excessive decomposition or sludge formation.

Our compound is highly inductible in multi-cylinder engines. During manifolding where more or less evaporation of the fuel occurs, our ester is soluble in the heavy ends to such an extent that it remains in solution even after most of the more volatile fuel components have vaporized. Thus, our compound presents no induction system deposit problems.

The novel ester of this invention is essentially insoluble in water, a mixture of isomers of dimethyl-(monochlorotolyl)-phosphate having a solubility at 25° C. of less than about 0.02 percent by weight. This further enables our compound to be used as a fuel additive since it remains dissolved in the fuel even when stored over water. Furthermore, our compound is hydrolytically stable and thus is not subject to deterioration resulting from the presence of water which is invariably present in commercial gasoline.

Another embodiment of this invention relates to improved antiknock fluids, i.e., composite additives. Commercial practice involves the provision of antiknock fluids which comprise organolead antiknock agents, notably tetraethyllead, one or more halogen scavengers and a blending agent, such as kerosene. Such fluids also contain organic dyes and may contain antioxidants, rust inhibitors, anti-icing agents, and the like. Thus, to further facilitate blending procedures, we provide antiknock fluids containing our novel phosphate ester in amount such that the phosphorus-to-lead atom ratio is from about 0.1:3 to about 1:3.

The composition of typical antiknock fluids of this invention is shown in Table II wherein the figures given are percent by weight.

Table II

| Component | Aviation Fluids | Automotive Fluids |
|---|---|---|
| Tetraethyllead | 53.00 to 60.45 | 53.06 to 60.52 |
| Ethylene dibromide | 30.79 to 35.11 | 15.41 to 17.58 |
| Ethylene dichloride | | 16.23 to 18.52 |
| Dye, kerosene, impurities | 2.52 to 2.87 | 1.60 to 1.82 |
| Dimethyl-(monochlorotolyl)-phosphate | 1.57 to 13.69 | 1.56 to 13.70 |

When blended with non-leaded hydrocarbons of the gasoline boiling range, our ester beneficially modifies the nature and properties of deposits which have previously accumulated in the engine. Consequently, the presence of our novel phosphate ester in amount up to about 65 pounds per 1000 barrels of gasoline resulted in the alleviation of surface ignition and spark plug fouling.

In the fuel and antiknock fluid embodiments of this invention, we can use our ester with various organic halide scavengers which react with the lead during combustion in the engine to form volatile lead halide. The halogen of these scavengers has an atomic weight between 35 and 80, that is, the active scavenging ingredient is chlorine and/or bromine. Such scavengers include trichlorobenzene, dibromotoluenes and, in general, those disclosed in U.S. Patents 1,592,954; 1,668,022; 2,364,921; 2,479,900; 2,479,901; 2,479,902; 2,479,903 and 2,496,983. In short, we employ scavengers containing only elements selected from the group consisting of carbon, hydrogen, bromine, chlorine, and oxygen. The amount of scavenger used is from about 0.5 to about 2.0 theory, a theory being defined as the quantity required to react with the lead to form lead halide—i.e., two atoms of halogen per atom of lead. When we use mixtures of bromine-containing and chlorine-containing scavengers, particularly bromo- and chloro-hydrocarbons, we prefer concentrations and proportions as described in U.S. Patent 2,398,281. Such concentrations are sufficient to control the amount of deposits formed in the engine.

The organolead antiknock agents used in the antiknock fuel and fluid embodiments of our invention are hydrocarbon lead compounds, that is, lead alkyls such as tetramethyllead, tetraethyllead, tetrapropyllead, dimethyldiethyllead, trimethylethyllead, and lead aryls such as tetraphenyllead, or mixtures thereof. Such compounds containing from 4 to 24 carbon atoms, one atom of lead, and a plurality of lead-to-carbon bonds must be capable of increasing the octane quality of gasoline when employed therein in antiknock quantities—0.5 to 6.5 grams of lead per gallon. Halogen-containing compounds, such as triethyllead bromide, may also be used.

The novel ester of this invention is useful as an additive to lubricating oils particularly those having a viscosity from about 30 seconds at 100° F. to about 250 seconds at 210° F. When so employed, our compound serves to reduce oxidation of the oil and its tendency to thicken at low temperatures while reducing bearing corrosion and improving lubricating characteristics, particularly of those oils designed for extreme pressure service such as hypoid gear lubricants. Concentrations of our ester up to about 5 percent by weight or higher can be used. However, ordinarily it is sufficient if the concentration is less than about 1 percent by weight.

Our ester is also useful as a fireproofing agent, particularly of normally inflammable textile materials. Not only does the phosphate of this invention render such materials as yarns and plastic compositions (e.g., cellulose acetate) fireproof without affecting their softness and draping qualities, but because our ester does not possess the property of irritating human skin such utility is enhanced. Our ester is also useful as a plasticizer particularly for vinyl resins. For example, our ester is capable of lowering the brittle point and stiffness of polyvinyl chloride when employed therein in relatively small concentrations.

This application is a divisional of our prior co-pending application, Serial No. 477,139, filed December 22, 1954, now U.S. Patent No. 2,870,186, issued January 20, 1959 which is, in turn, a continuation-in-part of application Serial No. 445,897, filed July 26, 1954, now abandoned.

As many widely differing variations of the present invention are possible without departing from the spirit and scope thereof, it is not intended that this invention be limited except as defined by the appended claims.

We claim:

1. Gasoline containing from 0.5 to 6.5 grams of lead per gallon as a lead alkyl antiknock agent and dimethyl-(monochlorotolyl)-phosphate in amount such that the phosphorus-to-lead atom ratio is from about 0.1:3 to about 1:3.

2. A gasoline additive consisting essentially of lead alkyl antiknock agent and dimethyl-(monochlorotolyl)-phosphate present in amount such that the phosphorus-to-lead atom ratio is from about 0.1:3 to about 1:3.

References Cited in the file of this patent

UNITED STATES PATENTS

| | | |
|---|---|---|
| 2,340,331 | Knutson et al. | Feb. 1, 1944 |
| 2,843,465 | Yust et al. | July 15, 1958 |
| 2,892,691 | Howell | June 30, 1959 |

FOREIGN PATENTS

| | | |
|---|---|---|
| 683,405 | Great Britain | Nov. 26, 1952 |
| 1,094,828 | France | Dec. 15, 1954 |